Figure 1:
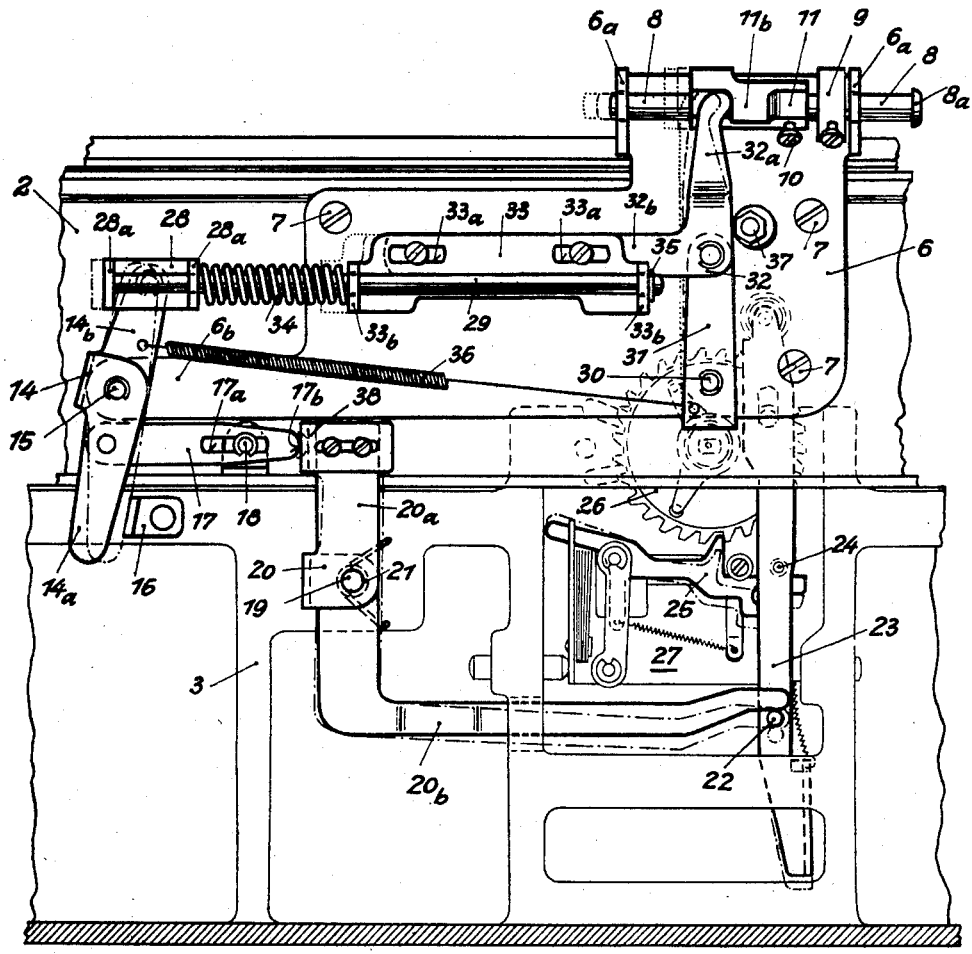

Feb. 10, 1959  H. HESS  2,873,016
BRAKING DEVICE FOR PAPER CARRIAGE OF OFFICE WRITING MACHINES
Filed Dec. 27, 1955  2 Sheets-Sheet 1

Inventor
Hans Hess
By Pierce, Scheffler & Parker
Attorneys

Feb. 10, 1959   H. HESS   2,873,016
BRAKING DEVICE FOR PAPER CARRIAGE OF OFFICE WRITING MACHINES
Filed Dec. 27, 1955   2 Sheets-Sheet 2

United States Patent Office 2,873,016
Patented Feb. 10, 1959

2,873,016

BRAKING DEVICE FOR PAPER CARRIAGE OF OFFICE WRITING MACHINES

Hans Hess, Wilhelmshaven, Germany, assignor to Olympia Werke A. G., Wilhelmshaven, Germany Application December 27, 1955, Serial No. 555,710

Claims priority, application Germany April 25, 1955

3 Claims. (Cl. 197—183)

This invention relates to a device for braking the paper carriage of office writing machines during carriage shifting in the zone of the line start position.

In all types of office writing machines provided with a movable paper carriage, in particular those which are equipped with an electric drive and/or are provided with a long paper carriage, it can be observed that in the end phase of the carriage shift during braking and stopping of the carriage, hard impacts on the gear mechanism occur in the line start position, which may become so great that damage is caused, for example in the stepping mechanism. These impacts may also have the effect that the machine moves away laterally on its support. Moreover, the banging impingement of the carriage in the line start position is felt as an undesirable noise. Attempts have been made to eliminate these disadvantages by providing, at various points in the machine, braking and noise-damping arrangements, such as rubber buffers. Upon protracted use, however, these means eventually fail to fulfill their purpose due to the deformation occurring in the course of time, and moreover, they lead to the result that a true-line starting position is not always ensured.

It is the object of the present invention to assure in office writing machines with paper carriage, a quiet running into the line start position occurring without hard shock, even when in use for a long time, without showing the consequences eventually occurring in other damping means, and it consists in that a stop disposed at the paper carriage and known in itself, e. g. a margin setter, acts displacingly on a lever arm assembly composed of two lever systems movable against each other and in operative connection with each other through an intermediate braking spring, designed as a helical compression spring, the lever arm assembly acting on the loose shift pawl of the stepping mechanism, for the purpose of releasing the shift pawl and subsequently braking the carriage, in such manner that during the displacement path of the first lever system cooperating with the loose shift pawl, correspondingly limited by a stop to at most the value of one step, the pawl is brought out of engagement with the shift wheel, and that by forward movement of the second lever system cooperating with the carriage stop, with the first lever system resting on the stop and the shift pawl being disengaged, the brake spring becomes operative on an adjustable brake path, whereupon the carriage returns into its line start position through the relaxation of the brake spring and thereby releases the lever arm assembly which is under the action of restoring springs, so that the shift pawl again engages with the shift wheel and holds the carriage in the line start position.

The first lever system consists, in the specific model illustrated, of a two-armed lever disposed pivotably on the rear wall of the carriage frame and cooperating with a limit-stop, the lower end of said lever having articulated to it a thrust rod guided in a horizontal direction which actuates a cranked angle lever which is under the action of a restoring spring and, being pivotably disposed at the lower frame of the machine, acts on the known releasing rod of the loose shift pawl of the stepping mechanism, while at the upper end of the two-armed lever there is articulated, by means of a strap, a bar fastened therein which is in operative connection with the second lever system consisting of a link pivotably disposed on the rear wall of the carriage frame and an angle lever articulated to the upper end of said link, said angle lever cooperating with the carriage stop and carrying a guide strap adjustable by means of a slot connection, in such maner that the bar is mounted in the guide strap so as to slide in axial direction, and the brake spring is arranged with initial compression between the straps around the bar. A restoring spring is provided between the two-armed lever and the link.

Figure 2:
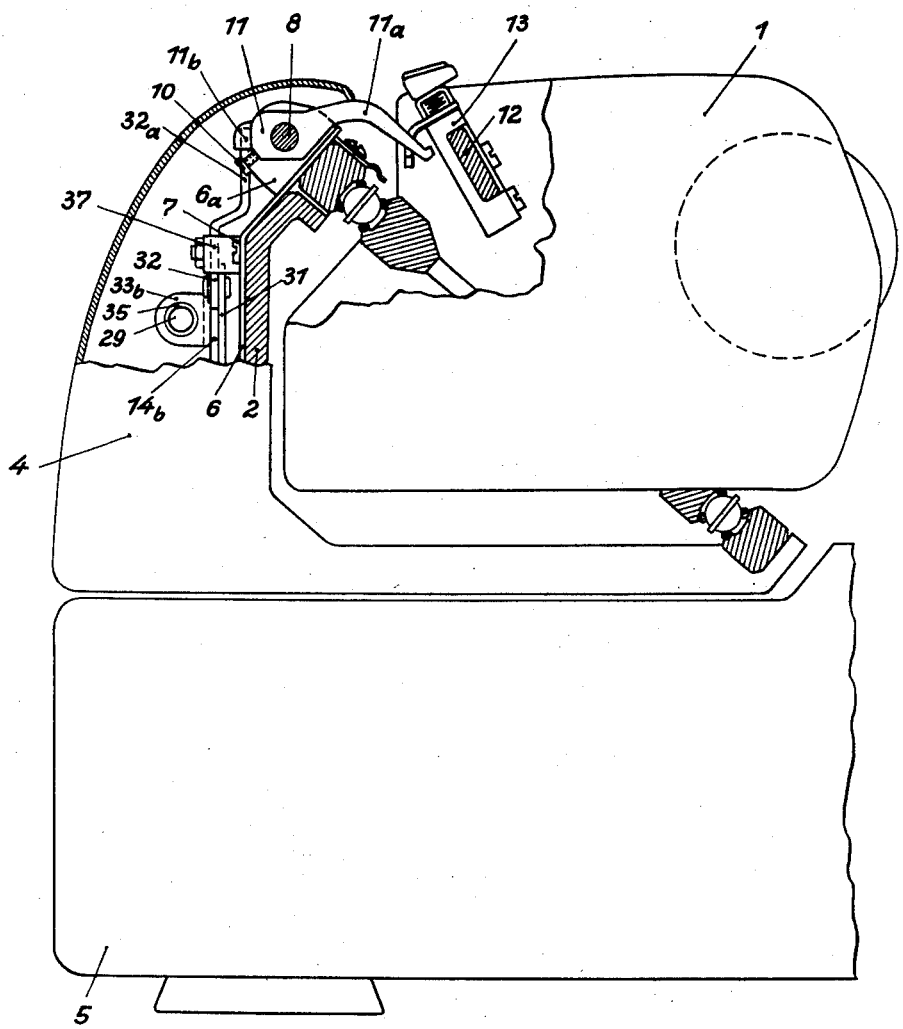

Further details of the construction will be seen from the drawing, which shows an embodiment of the invention. In these drawings:

Fig. 1 is a rear view in elevation of a portion of a writing office machine showing the device according to the invention in an over-all view; and Fig. 2 is a side view of the rear portion of the machine with details in cutaway representation.

With reference now to the drawings, the essential parts of the device according to the invention are assembled on the back of the machine frame 2 carrying the paper carriage 1 and on the lower machine frame 3, and are covered by the facing plates 4 and 5.

On a mounting plate 6, which is fastened by screws 7 to the rear wall of the carriage frame 2, there are provided, at the upper portion, two flanges 6a bent backward at right angles, in which a shaft 8 is mounted axially displaceable along a certain path, this path being limited by a collar 8a and a set ring 9. The shaft 8 supports a block 11 fastened by a screw 10, which block cooperates by an arm 11a extending over the upper edge of the frame 2 toward the front of the machine, with a margin setter 13, known in itself, and displaceable on the margin setter rail 12 of the paper carriage 1. On the back, the block 11 is provided with a lug 11b.

On a lateral arm 6b of the plate 6 there is arranged a cranked two-armed lever 14 adapted to pivot on a stationary shaft 15. Its angular path is limited by a stop 16 provided on the machine frame 3 and acting on the lower lever arm 14a of lever 14. The same lever arm 14a has articulated to it a thrust rod 17 which is guided by means of a slide 17a on a bolt 18 fixed on the frame 2 so as to slide in an approximately horizontal direction. At the lower machine frame 3 there is provided a shaft 19 on which a cranked angular lever 20 is disposed to pivot counter to the action of a rotary spring 21. The upper lever arm 20a of the angular lever 20 has adjustably fastened to it a stop plate 38 against which the rounded end 17b of the thrust rod 17 rests. The lower angular lever arm 20b of lever 20 is so designed and dimensioned that its free end extends over a bolt 22 of the conventional releasing rod 23. The releasing rod 23 cooperates in known manner through a second bolt 24 with the loose shift pawl 25 of the stepping mechanism 27 provided with the shift wheel 26.

The upper lever arm 14b of the two-armed lever 14 is provided with a strap 28 pivotally mounted upon it, the strap having a pair of spaced flanges 28a in which a bar 29 is rigidly fastened. The plate 6 has fixed on it at a level with the shaft 15 another shaft 30 on which a link 31 is pivotably disposed. The upper end of the link 31 has articulated to it an angle lever 32 which, by its upwardly extending arm 32a is applied laterally against the lug 11b of block 11. The horizontal arm 32b of the angle lever 32 has fastened adjustably to it a flanged guide strap 33 by means of slots 33a. The bar 29 is guided for sliding displacement in an axial direction in the two flanges 33b of strap 33. Between the two adjacent flanges 28a and 33b of the straps 28 and 33 there is provided under initial compression a brake spring 34, in the form of a helical compression spring, and placed on the shaft 29, the guide strap 33 being secured in its inoperative rest position on the bar 29 by a stop 35 mounted on the end thereof.

A return spring 36 is tensioned between arm 14b of the two-armed lever 14 and the link 31. The above described lever arm assembly is thus divided into two lever systems; the first system consists of the two-armed lever 14 with the thrust rod 17 and the bar 29 as articulated members, and with the cranked angle lever 20 acting on the loose shift pawl 25; the second system consists of the link 31 with the angle lever 32 and the guide strap 33 provided thereon, sliding on bar 29. The operative connection between the two systems is effected by the helical compression spring 34, the flexibility of which permits a movement of both systems in relation to each other.

The inoperative, or rest position of the lever arm assembly shown in Fig. 1 is determined by an adjustable stop 37 provided on plate 6 in the form of an eccentric screw.

The device operates in the following manner:

At the end of its shift movement, the carriage 1 strikes with the margin setter 13 against arm 11a of block 11 as the line start position is being exceeded, taking it along in the same direction of movement. Block 11, in turn, displaces the angle lever 32 applying against its lug 11b and movable through the link 31, which angle lever 32 transmits this movement through strap 33 to the compression spring 34 under initial compression to the two-armed lever 14 and pivots the latter counter-clockwise, the thrust rod 17 articulated on the lever arm 14a passing this movement on to the cranked angle lever 20, so that the latter executes a clockwise pivotal movement and in so doing disengages the loose shift pawl 25 from the shift wheel 26 through the releasing rod 23. This first phase of the movement of the entire lever arm assembly is limited to a path corresponding at most to one shift step in that the lever 14 strikes with its lever arm 14a against the stop 16. This position is shown in chain-dotted lines in Fig. 1. The initial compression of the helical spring 34 is such that the frictional resistance of the first lever system is overcome during this movement phase and spring 34 acts as a rigid connecting member between the two lever systems.

But since the kinetic energy of the carriage 1 further acts on the lever arm assembly through block 11, whereas the first lever system is prevented from continued movement by the stop 16 against which lever 14 rests, the angle lever 32 with its guide strap 33 will now slide along the bar 29 while the link 31 continues to pivot and will compress the brake spring 34 until the kinetic energy of the carriage is dissipated. The position of the second lever system at this moment is shown in dotted lines in Fig. 1. From this moment on, the energy stored in the brake spring 34 acts in an opposite direction through strap 33 of the angle lever 32 and block 11 on the carriage 1 and pushes the latter back in the writing direction. Shortly before the line start position is reached, the brake spring 34 has relaxed to an extent that all members of both lever systems involved in the movement as described so far are released and are brought back to their initial, inoperative positions by their return or restoring springs 21 or 36, respectively. At this moment also, the loose shift pawl 25 can return in known manner to its position of engagement with the shift wheel 26, the carriage 1 being retained in exactly the line start position.

As is now evident from the description and drawings, by means of the device of the invention, therefore, the braking of the carriage is effected, not on a path of less than one shift step, but after exceeding the line start position with disengagement of the loose shift pawl on a larger brake path where the helical compression spring 34 acting as a braking spring compensates the kinetic energy of the carriage 1. Yet such braking does not undesirably produce the effect of a shock on other parts of the machine.

In conclusion, while a preferred embodiment of the invention has been described and claimed, minor departures from the constructional arrangements may be made without, however, departing from the spirit and scope of the invention as defined in the appended claims.

I claim:

1. The combination with an office writing machine of the type comprising a paper carriage and a stepping mechanism for the carriage including a shift wheel and loose shift pawl for controlling said shift wheel; of a device for braking the carriage during the carriage shift in the zone of the line start position, said device comprising a lever arm assembly including first and second lever systems, braking spring means interconnecting said systems, means coupling said first lever system to the loose shift pawl of the carriage stepping mechanism for disconnecting said pawl from the shift wheel of said mechanism, a stop on the frame of said machine, means on said carriage for actuating said second lever system as said carriage initially exceeds the line start position in the carriage return movement, actuation of said second lever system being effective through said interconnecting spring means to actuate said first lever system to a position against said stop and simultaneously cause said loose shift pawl to be disconnected from said shift wheel, the remaining kinetic energy in said carriage effecting continued movement of said second lever system accompanied by an energy storing change in said interconnecting spring means which thereby gradually brakes said carriage to a momentary halt, the movement of said carriage then being reversed towards said line start position by the energy stored in said interconnecting braking spring means, and restoring spring means connected to said lever arm assembly for then restoring said assembly to its initial position whereupon said loose shift pawl reconnects with said shift wheel and holds said carriage in said line start position.

2. A carriage braking device as defined in claim 1 wherein said first lever system comprises a two-armed lever pivotally mounted intermediate its ends on the rear wall of the frame of said machine and movable against said stop on said machine frame, a thrust rod articulated to one arm of said two-armed lever, said thrust rod being guided in a horizontal direction, a first angle lever pivotally mounted on the rear wall of said machine frame and actuated by said thrust rod against the action of said restoring spring means, a releasing rod actuated by said first angle lever, said releasing rod being coupled to said loose shift pawl of said carriage stepping mechanism, a horizontally extending bar and means including a first strap articulating one end of said bar to the other arm of said two-armed lever, and wherein said second lever system comprises a link pivotally mounted intermediate the ends thereof on said rear wall of said machine frame, a second angle lever articulated to one end of said link and actuated by movement of said carriage, a guide strap secured to said second angle lever, said guide strap having apertured spaced flanges through which said bar of said first lever system is guided, and wherein said braking spring means surrounds said bar and is placed under compression between said first strap and said guide strap.

3. A carriage braking device as defined in claim 2 and wherein said restoring spring means includes a tension spring connected between said other arm of said two-armed lever of said first lever system and the other end of said link of said second lever system.

References Cited in the file of this patent
UNITED STATES PATENTS 2,232,114 Khalil _____ Feb. 18, 1941
2,258,116 Khalil _____ Oct. 7, 1941